United States Patent
Day (10) Patent No.: US 11,027,760 B1
(45) Date of Patent: Jun. 8, 2021

(54) SAFETY WHEELBARROWS AND METHODS OF MAKING

(71) Applicant: Alexander D. Day, Milwaukie, OR (US)

(72) Inventor: Alexander D. Day, Milwaukie, OR (US)

( * ) Notice: Subject to any disclaimer, the term of this patent is extended or adjusted under 35 U.S.C. 154(b) by 25 days.

(21) Appl. No.: 16/735,594

(22) Filed: Jan. 6, 2020

(51) Int. Cl.
*B62B 1/20* (2006.01)

(52) U.S. Cl.
CPC ..................... *B62B 1/20* (2013.01)

(58) Field of Classification Search
CPC .. B62B 1/18; B62B 1/20; B62B 1/202; B62B 1/206; B62B 1/208
See application file for complete search history.

(56) References Cited

U.S. PATENT DOCUMENTS

| | | | | |
|---|---|---|---|---|
| 356,473 A * | 1/1887 | James | ...................... | B62B 1/18 280/47.12 |
| 3,092,418 A * | 6/1963 | Themascus | ............... | B62B 3/08 298/3 |
| 3,170,707 A * | 2/1965 | Millar, Jr. | ................. | B62B 1/18 280/47.31 |
| 3,235,281 A * | 2/1966 | Faucette, Jr. | ............. | B62B 1/18 280/47.31 |
| 3,282,600 A * | 11/1966 | Tonelli | ...................... | B62B 1/18 280/47.31 |
| 7,547,026 B2 * | 6/2009 | Morris | ...................... | B62B 1/18 280/47.31 |
| 7,900,939 B2 * | 3/2011 | Robinson | .................. | B62B 1/18 280/47.31 |
| 9,296,404 B1 * | 3/2016 | Bell | .......................... | B62B 1/16 |
| 2003/0205417 A1 * | 11/2003 | Simons | .................... | B62B 1/206 180/19.1 |
| 2003/0218305 A1 * | 11/2003 | Nicolay | ..................... | B62B 5/06 280/47.31 |
| 2004/0026898 A1 * | 2/2004 | Tomchak | ................ | B62B 1/208 280/653 |
| 2005/0087958 A1 * | 4/2005 | Tomchak | .................. | B62B 1/20 280/653 |

\* cited by examiner

*Primary Examiner* — Bryan A Evans
(74) *Attorney, Agent, or Firm* — Baumgartner Patent Law; Marc Baumgartner (57) ABSTRACT

Disclosed herein are new wheelbarrows and methods of making the same that are designed for taller users and are configured to help avoid hazards on the ground while hauling loads, thereby making a safer working environment.

12 Claims, 7 Drawing Sheets

SAFETY WHEELBARROWS AND METHODS OF MAKING

FIELD OF THE INVENTION

The invention pertains to the field of wheelbarrows, and methods of manufacturing the same. More particularly, the invention relates to improved, safer, wheelbarrows that are made to accommodate taller users by making it easier to push a heavy load and navigate obstacles.

BACKGROUND

Wheelbarrows have been the preferred equipment choice to manually haul heavy loads on work sites, such as construction or landscaping jobs. While accommodating average height workers, pushing a loaded wheelbarrow is significantly more difficult and dangerous for taller users, such as those who are 6'1" or taller. More specifically, if a shorter user and taller user are both gripping the handles at the same height on their bodies (e.g., hands at their hips) the downward angle of the front stop (front wheel bumper) is much steeper for the taller user, and thus lowers its clearance height. The lowered clearance for the taller user is, at the very least, an annoying inconvenience, but is more often a significant safety hazard as it greatly increases the chance of hitting an obstacle on the ground and/or inadvertently tipping over, such as when it is moved over uneven ground. Either of these situations can cause lasting physical harm to the user, non-exclusively including back injuries and broken bones. This danger is exacerbated when the wheelbarrow is loaded with a large and/or heavy load, such as wood, metal, and rock. Large heavy loads are very common and dangerous, especially on construction sites, where loads can often be between 150-300 lbs. In addition to harming the user, these situations could also injure other bystanders or cause property damage.

US Patent Application Publication No. 2018/0237045 attempted to solve this problem by raising the front stop at an upward angle. This proposed remedy has some disadvantages in that it does not actually raise the height of the handles. Thus, a taller user still has to bend over the same amount as if they were using a standard prior art wheelbarrow. As hunching over a heavy workload, such as 150-300 pounds, increases the risk of back injury, this danger should be taken into account when designing a safer wheelbarrow. Accordingly, there remains a need in the art to provide improved, safer wheelbarrows that can mitigate the hazards that current wheelbarrows pose to taller users.

SUMMARY

Various aspects of the invention are enumerated in the following paragraphs. Preferred embodiments are directed to: a wheelbarrow comprising: a tray having a base with an underside, and an upper rim; left and right-side wedges, having top surfaces and bottom surfaces, the top surfaces attached to the underside of the tray; left and right-side handles, comprising grips at back ends and a front stop that couples front ends together, further comprising top surfaces and bottom surfaces, the top surfaces attached to the bottom surface of the wedges; a front brace coupled to the underside of the tray, and the topsides of the handles; left and right-side risers comprising front and back ends, and top and bottom surfaces defining a height of between 1-4 inches, the top surfaces attached to the bottom surfaces of the handles; a stand coupled to the bottom surfaces of the risers; and an axled wheel and left and right axle brackets coupled to the bottom surfaces of the risers.

Further embodiments include wheelbarrows wherein the angles between the front surfaces of the risers and the bottom surfaces of the handles are between 91-160°, the angles between the back surfaces of the risers and the bottom surfaces of the handles are between 91-160°, the angles between the front surfaces of the risers and the bottom surfaces of the handles are between 110-145°, the angles between the back surfaces of the risers and the bottom surfaces of the handles are between 110-145°. Further embodiments are directed to risers that are between 28-52 inches in length.

Further embodiments are directed to wheelbarrows comprising: a tray having a base with an underside, and an upper rim; left and right-side wedges, having top surfaces and bottom surfaces, the top surfaces attached to the underside of the tray; left and right-side raised handles, comprising grips at back ends and a front stop that couples front ends together, further comprising top surfaces and bottom surfaces defining a main section height of between 3-6 inches that cuts away to heights of between 1-3 inches at the front and back of the main section, and wherein the top surfaces attached to the bottom surface of the wedges; a front brace coupled to the underside of the tray, and the topsides of the raised handles; a stand coupled to the bottom surfaces of the raised handles; and an axled wheel and left and right axle brackets coupled to the bottom surfaces of the raised handles. Preferred embodiments include wheelbarrows wherein the angles of the front cutaways are between 91-160°, the angles of the back cutaways are between 91-160°, the angles of the front cutaways are between 110-145°, and the angles of the back cutaways are between 110-145°. Preferably the raised handles are between 28-52 inches in length.

Further embodiments are directed to methods of converting a wheelbarrow comprising: (a) providing a wheelbarrow comprising: a tray having a base with an underside, and an upper rim; left and right-side wedges, having top surfaces and bottom surfaces, the top surfaces attached to the underside of the tray; left and right-side handles, comprising grips at back ends and a front stop that couples front ends together, further comprising top surfaces and bottom surfaces, the top surfaces attached to the bottom surface of the wedges; a front brace coupled to the underside of the tray, and the topsides of the handles; a stand coupled to the bottom surfaces of the handles; an axled wheel and left and right axle brackets coupled to the bottom surfaces of the handles; wherein the wheelbarrow further comprises: a first factory bolt within a first channel system traversing through the front brace, the handles, and the axle brackets; a second factory bolt within a second channel system traversing through the handles and the axle brackets; a third factory bolt within a third channel system traversing through the tray, the wedges, the handles and the stand; and a fourth factory bolt within a fourth channel system traversing through the tray, the wedges, the handles, and the stand; removing the first, second, third, and fourth factory bolts from their respective channel systems; providing left and right-side risers comprising front and back ends, and top and bottom surfaces defining a height of between 1-4 inches, and first, second, third, and fourth channels; inserting the risers below the handles such that the top surfaces of the risers abut against the bottom surfaces of the handles, and the risers first, second, third, and fourth channels align with the first, second, third, and fourth channel systems respectively;

providing new first, second, third, and fourth bolts that are longer than their respective factory bolts by at least the height of the risers and inserting said new bolts into their respective channel systems such that the stand couples to the bottom surfaces of the risers; and the axle brackets couple to the bottom surfaces of the risers.

DETAILED DESCRIPTION OF THE INVENTION

The teachings herein are directed to new wheelbarrows and methods of making the same. In general, there are two ways of making the wheelbarrows herein. The first, is to modify an existing wheelbarrow by disassembling it and inserting a left and right riser 26 and 26', and the second is to commercially manufacture a wheelbarrow 2 and implement novel left and right raised handles 78 and 78', instead of traditional handles 6 and 6'. The raised handles 78 and 78' can also be used with existing wheelbarrows by first disassembling the wheelbarrow and inserting the new raised handles 78 and 78', but it is more efficient and less expensive to simply insert the risers 26 and 26' to pre-existing wheelbarrows.

Figure 1A:
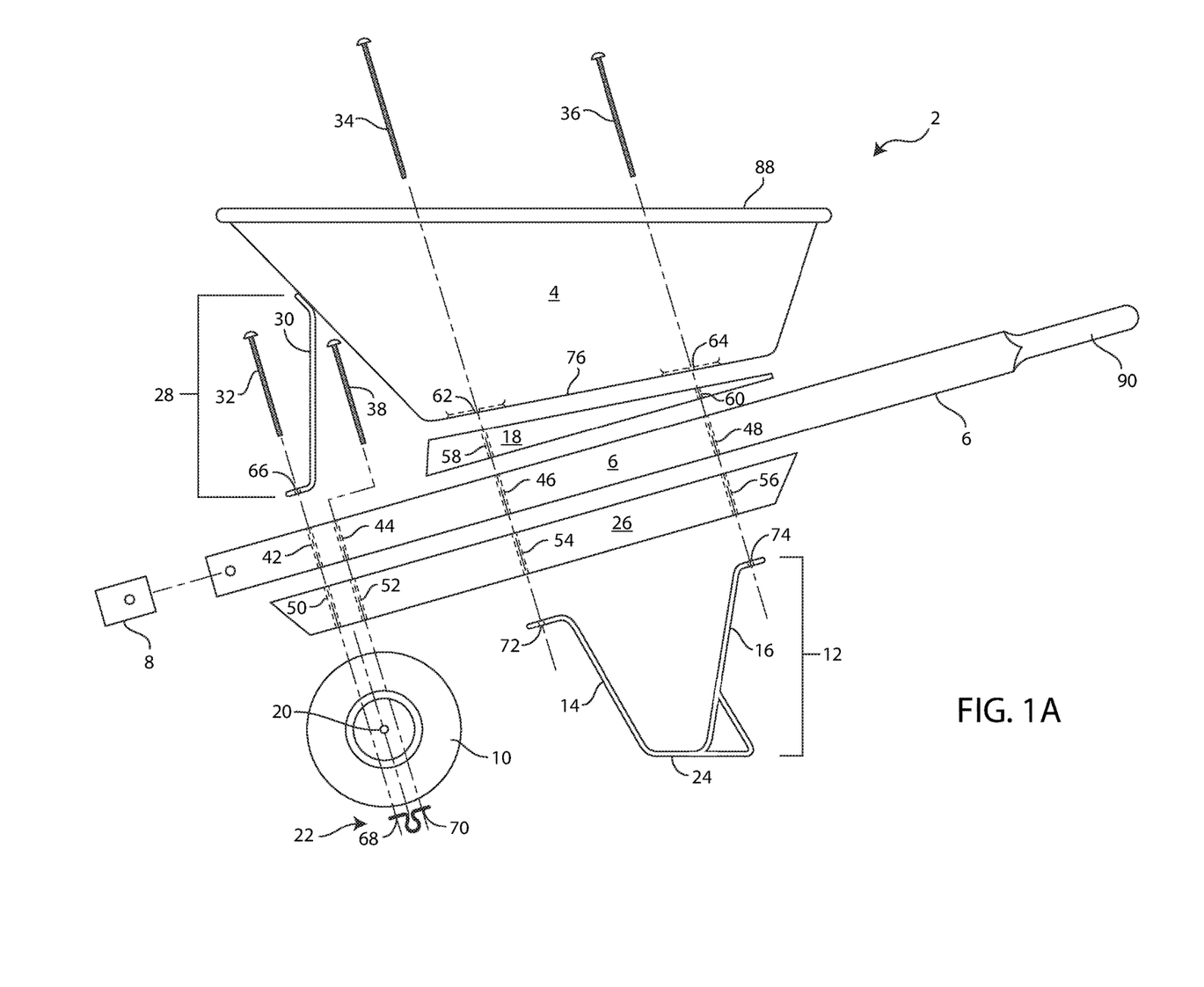
FIG. 1A is a perspective, exploded, left-side view of a converted wheelbarrow.
Figure 1B:
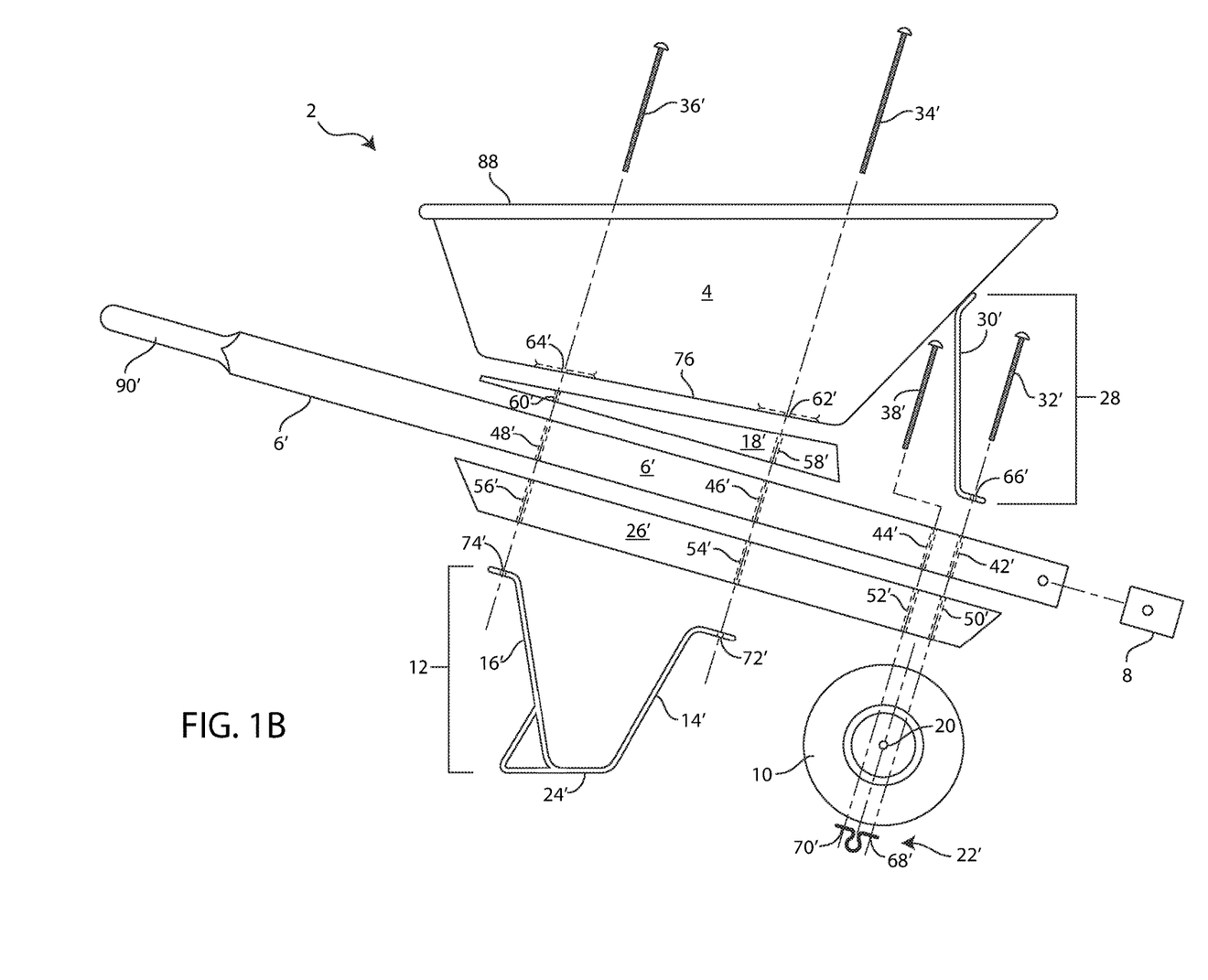
FIG. 1B is a perspective, exploded, right-side view of a converted wheelbarrow.
Figure 5A:
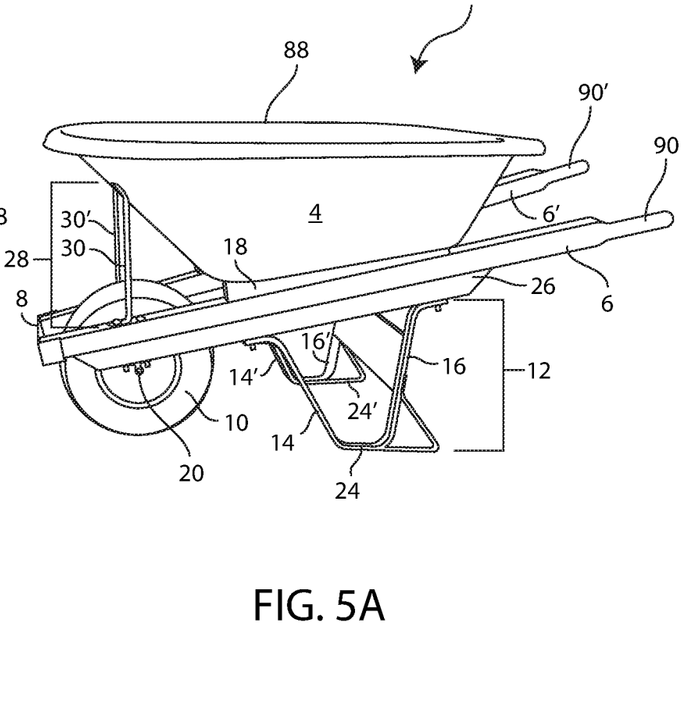
FIG. 5A is a perspective, left-side view of a converted wheelbarrow.
Figure 5B:
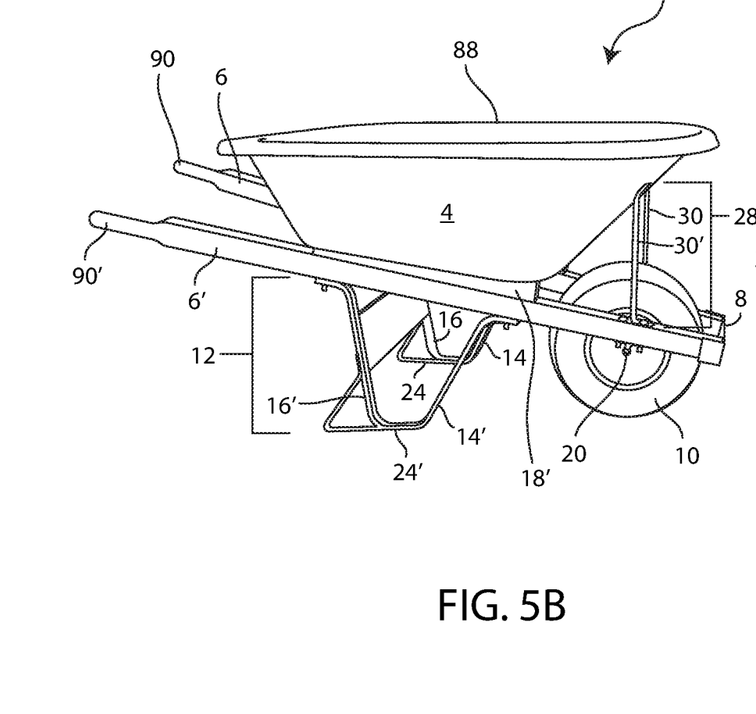
FIG. 5B is a perspective, right-side view of a prior art wheelbarrow.

FIGS. 1A and 1B depict left and right-side exploded views, depicting the insertion of left and right risers 26 and 26' to an existing wheelbarrow 2. FIG. 5B shows the right-side of an assembled, standard prior art wheelbarrow and FIG. 5A shows the left-side of an assembled wheelbarrow that has been modified by inserting the left and right risers 26 and 26'. The left and right sides of the wheelbarrows herein are generally identical, thus all disclosure herein directed to features on either side can be applicable to the other side.

With reference to FIGS. 5B, 5A, 1A, and 1B, a standard prior art wheelbarrow includes a tray 4 having an upper rim 88 and a base 76, mounted on top of left and right wedges 18 and 18' which in turn are mounted on top of a left and right handles 6 and 6'. The handles 6 and 6' terminate with grips 90 and 90' at the back of the wheelbarrow configured for a user's hands and a front stop 8 at the front of the wheelbarrow that connects both handles 6 and 6'. A wheel 10 is positioned behind the front stop 8, having a central axle 20 traversing through, and that is mounted to the underside of the handles 6 and 6' through left and right axle brackets 22 and 22'. A front brace 28 is mounted on top of the handles 6 and 6' that supports the front underside of the tray 4 and has left and right uprights 30 and 30' that straddle the top half of the wheel 10. A stand 12 is mounted underneath the middle section of the handles 6 and 6' and can include front left and right legs 14 and 14' and back left and right legs 16 and 16' that are connected by left and right bottoms 24 and 24' that are configured to rest on the ground when the wheelbarrow is set down.

The base 76 of the tray 4, the wedges 18 and 18', the handles 6 and 6', the front brace 28, axle brackets 22 and 22', and stand 12, have multiple channels that align with another and can be secured by nuts and bolts, and/or threads and bolts, for example.

With reference to FIG. 1A, the left upright 30 includes a channel 66 that aligns with a first left handle channel 42, and a front left axle bracket channel 68—collectively defining a first channel system. A second left handle channel 44 aligns with the back left axle bracket channel 70—collectively defining a second channel system. A first left tray channel 62, aligns with a first left wedge channel 58, a third left handle channel 46, and a left front leg channel 72—collectively defining a third channel system. Finally, a second left tray channel 64 aligns with a second left wedge channel 60, a fourth left handle channel 48, and a left back leg channel 74—collectively defining a fourth channel system.

Similarly, with reference to FIG. 1B, the right upright 30' includes a channel 6' that aligns with a first right handle channel 42' and a front right axle bracket channel 68'—collectively defining a first channel system. A second right handle channel 44' aligns with the back right axle bracket channel 70'—collectively defining a second channel system. A first right tray channel 62', aligns with a first right wedge channel 58', a third right handle channel 46', and a right front leg channel 72'—collectively defining a third channel system. Finally, a second right tray channel 64 aligns with a second right wedge channel 60, a fourth right handle channel 48, and a right back leg channel 74—collectively defining a fourth channel system.

During disassembly of a standard prior art wheelbarrow (e.g., FIG. 5B) the pre-existing bolts or other fasteners can be removed from above-described channels thereby disconnecting these parts from each other. Subsequently, left and right risers 26 and 26' having channels that are aligned with these disassembled parts can be inserted below the handles 6 and 6' and fastened to create an assembled modified wheelbarrow, such as shown in FIG. 5A. More specifically, and with reference to FIGS. 1A and 1B, the risers 26 and 26' have a first channel 50/50' that aligns with the first channel system, a second channel 52/52' that aligns with the second channel system, a third channel 54/54' that aligns with the third channel system, and a fourth channel 56/56' that aligns with the fourth channel system. The channels in the risers 26 and 26' can be created using any suitable method, such as drilling using a bit suitable to the material the risers are created from.

Figure 2:
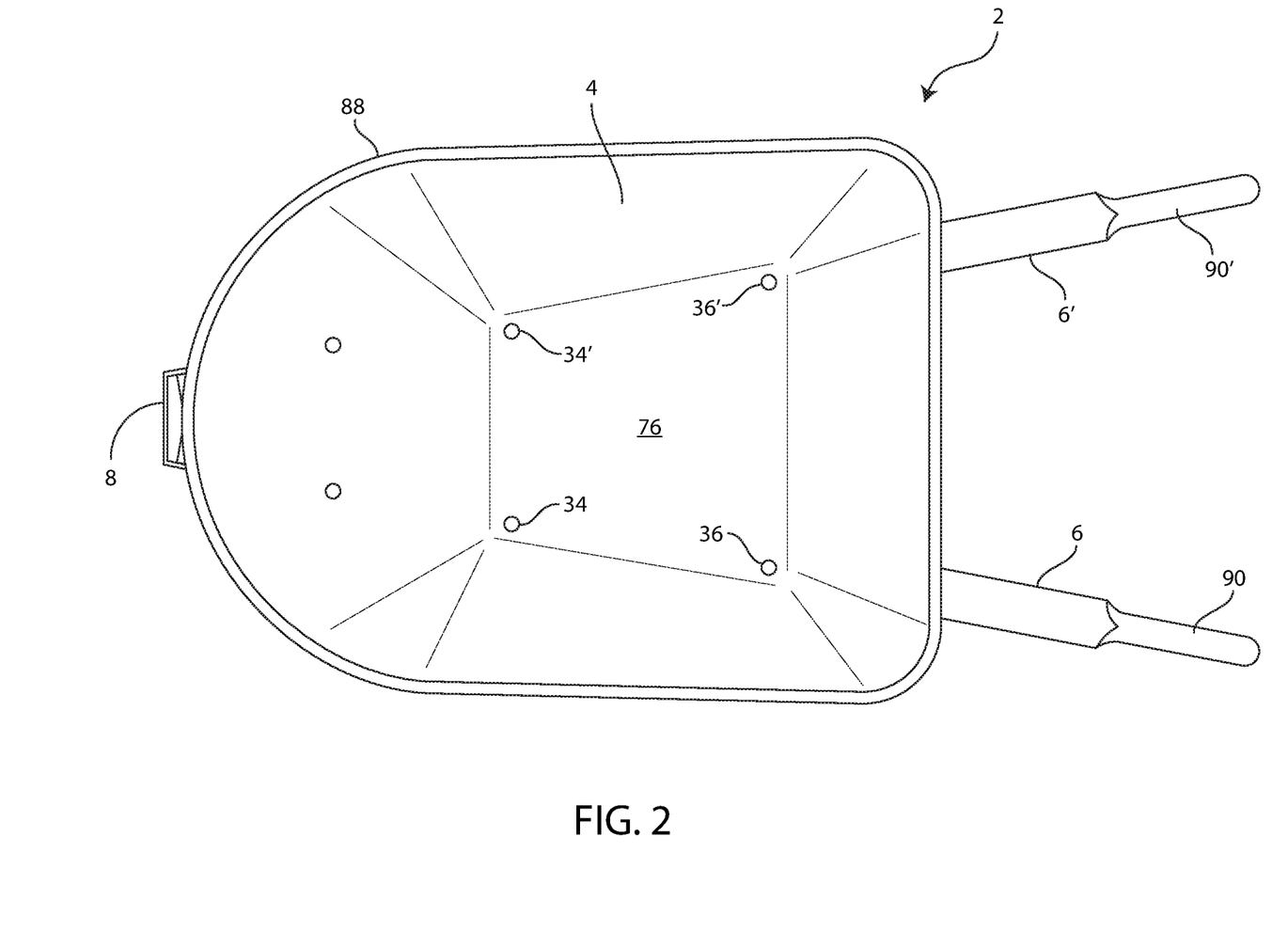
FIG. 2 is a perspective top view of a wheelbarrow.
Figure 3:
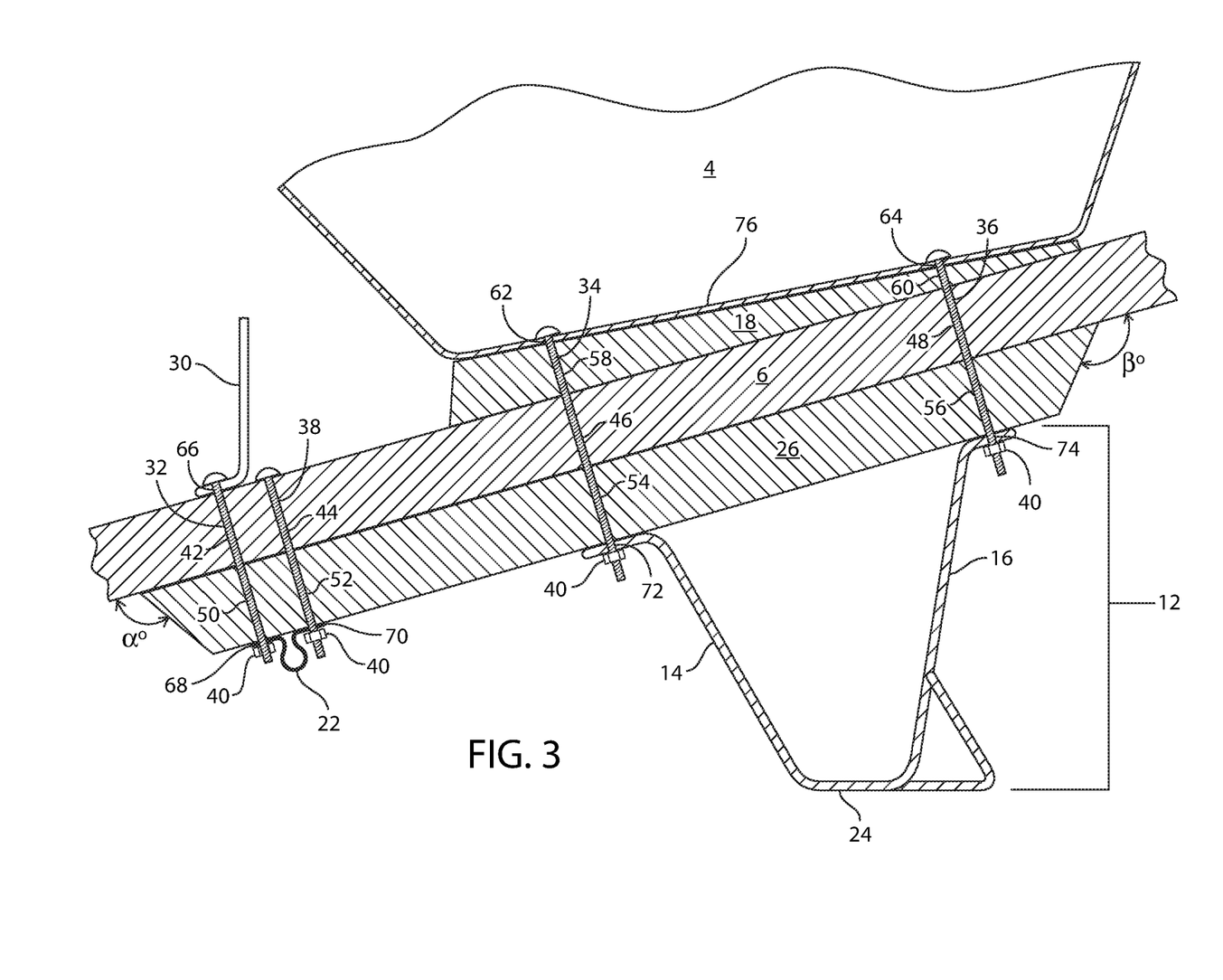
FIG. 3 is a perspective, close-up, left-side view.

As the risers 26 and 26' elongate the pre-existing channel systems from a fabricated wheelbarrow, new fasteners that are longer than the pre-existing fasteners (e.g., bolts) are utilized to accommodate the increased height. More specifically, if the risers are 2 inches in height, bolts that are at least 2 inches longer than the factory installed bolts can be used. Similarly, if the risers are 4 inches in height, bolts that are at least 4 inches longer than the factory installed bolts can be used. A first bolt 32/32' traverses through the first channel system, a second bolt 38/38' traverses through the second channel system, a third bolt 34/34' traverses through the third channel system, and the fourth bolt 36/36' traverses through the fourth channel system. All bolts can be secured at the bottom by nuts 40. Alternatively, internal threads can be added in one or more locations in the channel systems that the bolts can engage with to secure wheelbarrow parts together—such as the internal channels (50/50', 52/52', 54/54', 56/56') of the risers 26 and 26'. According to preferred embodiments, the first, second, and fourth bolts are the same length—approximately five inches, while the third bolt 34 is longer, preferably around six inches to traverse through the thicker portion of the wedge 18/18'. FIG. 3 depicts a close up left-side view of the channel systems aligned and fastened together with nuts and bolts. A right-side close-up depiction is not shown but would be the mirror image of FIG. 3. FIG. 2 depicts a bird's eye view of the assembled wheelbarrow 2 showing the tops of bolts 34/34' and 36/36' that traverse through the third and fourth channel systems.

Preferred risers 26 and 26' are made from any suitable sturdy material, such as wood, metal, aluminum, steel, plastic, fiberglass, composite wood, and the like. According to preferred embodiments, the risers 26 and 26' have the same or similar thickness of the pre-existing handles 6 and 6' to make fastening easier. As most standard handles 6 and 6' are 2×2 inches (with the exception of the grips 90 and 90'), it is preferred that the risers 26 and 26' have a thickness of 2 inches or between 1 and 3 inches, or within an inch of the thickness of the handles 6 and 6'. Preferred risers 26 and 26' have a height of 2 inches, thus 2×2 inch boards are an advantageous material to make the risers 26 and 26' herein. According to further embodiments, other heights of risers 26 and 26' are also provided herein. For example, heights of 1-4 inches are also envisioned, thus 2×4 inch boards can be used herein for extremely tall users, who would like to raise a standard wheelbarrow by 4 more inches. As 2×2 inch, and 2×4 inch, are standard sizes for wooden boards, these are preferred materials for making the risers 26 and 26' herein. Preferred lengths of risers 26 and 26' herein are shorter than the handles 6 and 6' and longer than the wedges 18 and 18'. As standard handles 6 and 6' are about 5 feet long, the preferred length of the risers 26 and 26' are less than 5 feet long and more preferably between 28-52 inches, and still more preferably 36 inches in length.

According to further preferred embodiments, and as shown in FIG. 3, the front ends of the risers 26 and 26' are angled upward creating an obtuse (greater than 90°) angle α with the underside of the handles 6 and 6'. More specifically it is preferred that the a angle is between 91-160°, and more preferably between 110-145°. In general, the greater the angle, the greater the clearance over obstacles on the ground, thereby increasing the safety of the wheelbarrow. According to non-preferred embodiments, the front ends of the risers 26 and 26' are not angled upward and just create a 90° angle with the underside of the handles 6 and 6' which decreases the clearance. Similarly, the back ends of the risers 26 and 26' are likewise preferably angled upward creating an obtuse angle β with the underside of the handles 6 and 6', preferably between 91-160°, more preferably between 110-145°, but can also non-preferably be 90° or less.

Figure 4A:
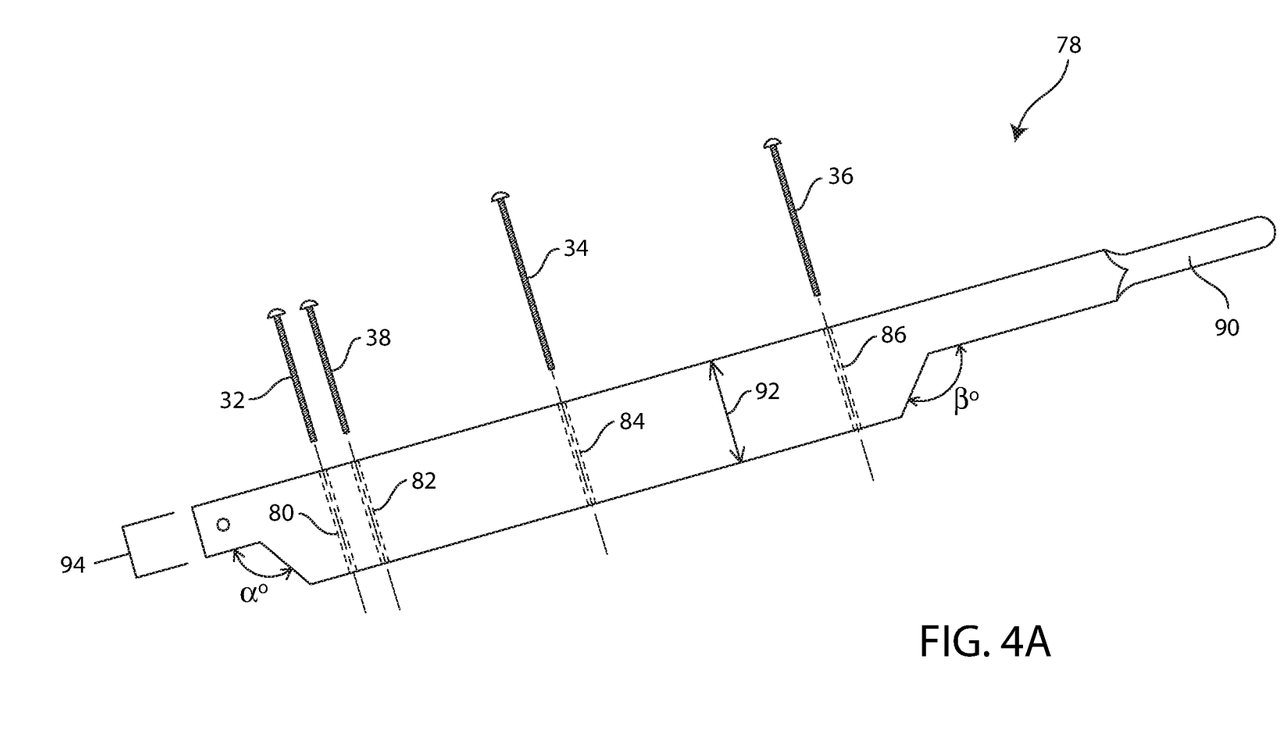
FIG. 4A is a perspective, left-side view of a raised handle.
Figure 4B:
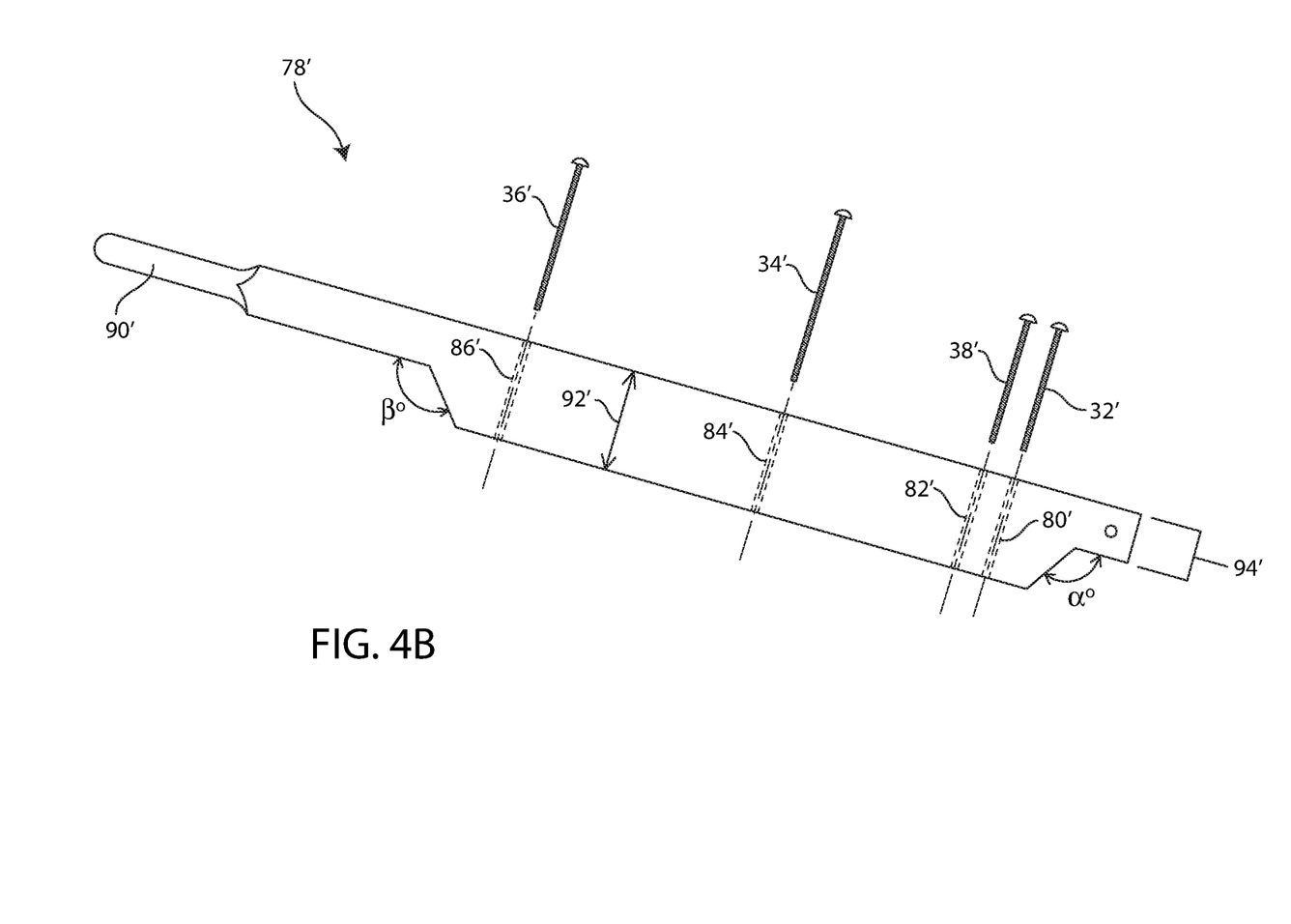
FIG. 4B is a perspective, right-side view of a raised handle.

A second embodiment of manufacturing new wheelbarrows is also provided herein. FIGS. 4A and 4B depict views of left and right raised handles 78 and 78' that can be incorporated into wheelbarrows in lieu of standard stock handles 6 and 6' during manufacturing. The raised handles 78 and 78' have a main section height 92/92' that cuts away to a shorter height 94/94' at angles α and β at the front and back. These angles can be the same degree as described above with the risers 26 and 26' and the underside of the handles 6 and 6'. In sum, both angles are preferably obtuse, such as between 91-160°, or 110-145°, but can also non preferably be 90°, or less. The raised handles 78 and 78' have first channels 80/80' substituting for channels 42/42' and 50/50' in the first channel system, second channels 82/82' substituting for channels 44/44' and 52/52' in the second channel system, third channels 84/84' substituting for channels 46/46' and 54/54' in the third channel system, and fourth channels 86/86' substituting for channels 48/48' and 56/56' in the fourth channel system.

The preassembled raised handles 78 and 78' can be the same dimensions as the combination of handles 6 and 6' and risers 26 and 26' described above. For example, the preferred main section height 92/92' of the raised handles 78 and 78' is between 3-6 inches, and more preferably 4 inches heights. The cut-away height 94/94' is preferably between 1-3 inches, and more preferably 2 inches. Like the risers 26 and 26', the raised handles 78 and 78' can be made from any suitable sturdy material, such as wood, metal, aluminum, steel, plastic, fiberglass, composite wood, and the like. Preferably, the raised handles 78 and 78' are made as a singular piece from the same material, but can be made from two pieces of the same or different materials—such as combining the risers 26 and 26' with the handles 6 and 6'. Thus, new wheelbarrows described herein can be assembled at a factory using any traditional or known method with the exception of incorporating raised handles 78 and 78' instead of standard handles 6 and 6' and providing longer bolts to accommodate the increased height difference from the standard handles 6 and 6'. Additionally, according to non-preferred embodiments, standard prior art wheelbarrows can be converted to accommodate taller users by swapping in raised handles 78 and 78' for the standard handles 6 and 6', but it is more efficient and cheaper to substitute risers 26 and 26' for the standard handles 6 and 6'.

The invention claimed is:

1. A wheelbarrow comprising:
a tray having a base with an underside, and an upper rim;
left and right-side wedges, having top surfaces and bottom surfaces, the top surfaces attached to the underside of the tray;
left and right-side handles, comprising grips at back ends and a front stop that couples front ends together, further comprising top surfaces and bottom surfaces, the top surfaces attached to the bottom surface of the wedges;
a front brace coupled to the underside of the tray, and the topsides of the handles;
left and right-side risers comprising front and back ends, and top and bottom surfaces defining a height of between 1-4 inches, the top surfaces attached to the bottom surfaces of the handles;
a stand coupled to the bottom surfaces of the risers; and
an axled wheel and left and right axle brackets coupled to the bottom surfaces of the risers.

2. The wheelbarrow of claim 1, wherein the angles between the front surfaces of the risers and the bottom surfaces of the handles are between 91-160°.

3. The wheelbarrow of claim 2, wherein the angles between the back surfaces of the risers and the bottom surfaces of the handles are between 91-160°.

4. The wheelbarrow of claim 1, wherein the angles between the front surfaces of the risers and the bottom surfaces of the handles are between 110-145°.

5. The wheelbarrow of claim 4, wherein the angles between the back surfaces of the risers and the bottom surfaces of the handles are between 110-145°.

6. The wheelbarrow of claim 1, wherein the risers are between 28-52 inches in length.

7. A method of converting a wheelbarrow comprising:
(a) providing a wheelbarrow comprising:
a tray having a base with an underside, and an upper rim;

left and right-side wedges, having top surfaces and bottom surfaces, the top surfaces attached to the underside of the tray;

left and right-side handles, comprising grips at back ends and a front stop that couples front ends together, further comprising top surfaces and bottom surfaces, the top surfaces attached to the bottom surface of the wedges;

a front brace coupled to the underside of the tray, and the topsides of the handles;

a stand coupled to the bottom surfaces of the handles;

an axled wheel and left and right axle brackets coupled to the bottom surfaces of the handles;

first factory bolts within a first channel system traversing through the front brace, the handles, and the axle brackets;

second factory bolts within a second channel system traversing through the handles and the axle brackets;

third factory bolts within a third channel system traversing through the tray, the wedges, the handles and the stand;

and fourth factory bolts within a fourth channel system traversing through the tray, the wedges, the handles, and the stand;

(b) removing the first, second, third, and fourth factory bolts from their respective channel systems;

(c) providing left and right-side risers comprising front and back ends, and top and bottom surfaces defining a height of between 1-4 inches, and first, second, third, and fourth channels;

(d) inserting the risers below the handles such that the top surfaces of the risers abut against the bottom surfaces of the handles, and the risers first, second, third, and fourth channels align with the first, second, third, and fourth channel systems respectively; and (e) providing new first, second, third, and fourth bolts that are longer than their respective factory bolts by at least the height of the risers and inserting said new bolts into their respective channel systems such that the stand and axle brackets couples to the bottom surfaces of the risers; and the bottom surfaces of the handles couple to the top surfaces of the risers.

8. The method of claim 7, wherein the angles between the front surfaces of the risers and the bottom surfaces of the handles are between 91-160°.

9. The wheelbarrow of claim 8, wherein the angles between the back surfaces of the risers and the bottom surfaces of the handles are between 91-160°.

10. The method of claim 7, wherein the riser is a 2×2 inch board.

11. The method of claim 7, wherein the first, second, and fourth new bolts are the same length, and the third bolts are longer than the other bolts.

12. The method of claim 7, wherein the risers are between 28-52 inches in length.

* * * * *